United States Patent
Swanson et al.

(10) Patent No.: US 11,594,249 B2
(45) Date of Patent: *Feb. 28, 2023

(54) PROCESS COUPONS USED IN MANUFACTURING FLEXURES

(71) Applicant: Hutchinson Technology Incorporated, Hutchinson, MN (US)

(72) Inventors: Kurt C. Swanson, Chippewa Falls, WI (US); Brian D. Boudreau, Charlotte, NC (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/162,927

(22) Filed: Jan. 29, 2021

(65) Prior Publication Data

US 2021/0225396 A1  Jul. 22, 2021

Related U.S. Application Data

(62) Division of application No. 15/598,909, filed on May 18, 2017, now Pat. No. 10,910,003.

(Continued)

(51) Int. Cl.
*G11B 5/127* (2006.01)
*H04R 31/00* (2006.01)
(Continued)

(52) U.S. Cl.
CPC .......... *G11B 5/4833* (2013.01); *G11B 5/3166* (2013.01); *G11B 5/484* (2013.01)

(58) Field of Classification Search
CPC ...... G11B 5/3166; G11B 5/484; G11B 5/4833
See application file for complete search history.

(56) References Cited

U.S. PATENT DOCUMENTS 5,299,081 A * 3/1994 Hatch .................. G11B 5/4833
                                              360/234.6
5,771,138 A   6/1998 Zarouri et al.
(Continued)

FOREIGN PATENT DOCUMENTS

CN     103340022 A    10/2013
CN     104205216 A    12/2014
(Continued)

OTHER PUBLICATIONS

Notice of Reasons for Refusal in Japanese Patent Application No. 2018-560567, dated Aug. 3, 2021.
(Continued)

*Primary Examiner* — Paul D Kim
(74) *Attorney, Agent, or Firm* — DLA Piper LLP (US)

(57) ABSTRACT

A system and methods for manufacturing devices such as flexures using process coupons are described are described. The method including performing a test on at least one feature of a coupon, the coupon is included on an assembly sheet used in manufacturing flexures. The at least one feature is produced by a manufacturing processing step that is used to produce a portion of a flexure. And, the physical characteristics of the feature include at least one physical characteristic that is different than physical characteristics of the portion. The method also including determining the manufacturing processing step will produce an abnormal portion of a flexure based on the performed test. Further, the method includes adjusting the manufacturing processing step and manufacturing a portion of a flexure using the adjusted manufacturing processing step.

18 Claims, 9 Drawing Sheets

Related U.S. Application Data

(60) Provisional application No. 62/338,118, filed on May 18, 2016.

(51) Int. Cl.
*G11B 5/48* (2006.01)
*G11B 5/31* (2006.01)

(56) References Cited

U.S. PATENT DOCUMENTS

| | | | |
|---|---|---|---|
| 7,142,395 | B2 | 11/2006 | Swanson et al. |
| 7,384,531 | B1 | 6/2008 | Peltoma et al. |
| 7,388,733 | B2 | 6/2008 | Swanson et al. |
| 7,497,006 | B2 | 3/2009 | Davis et al. |
| 7,697,237 | B1* | 4/2010 | Danielson ............ G11B 5/4846 360/245.9 |
| 7,929,252 | B1 | 4/2011 | Hentges et al. |
| 8,082,656 | B1 | 12/2011 | Pokornowski et al. |
| 8,144,430 | B2 | 3/2012 | Hentges et al. |
| 8,169,746 | B1 | 5/2012 | Rice et al. |
| 8,448,329 | B2 | 5/2013 | Rice et al. |
| 8,866,020 | B2 | 10/2014 | Ishii |
| 8,885,299 | B1 | 11/2014 | Bennin et al. |
| 8,928,335 | B1 | 1/2015 | Roen |
| 9,093,117 | B2 | 7/2015 | Tobias |
| 9,451,704 | B2 | 9/2016 | Ihara et al. |
| 9,841,457 | B1 | 12/2017 | Sasaki et al. |
| 10,910,003 | B2 | 2/2021 | Swanson et al. |
| 2006/0236527 | A1 | 10/2006 | Davis et al. |
| 2008/0130175 | A1 | 6/2008 | Jeong et al. |
| 2012/0069475 | A1* | 3/2012 | Benda ............... B29C 45/14344 360/244.2 |
| 2013/0098885 | A1 | 4/2013 | Takei et al. |
| 2013/0144416 | A1 | 6/2013 | Rataul |
| 2013/0248231 | A1 | 9/2013 | Tobias |
| 2014/0126169 | A1 | 5/2014 | Ihara et al. |
| 2015/0181695 | A1 | 6/2015 | Ichinose et al. |

FOREIGN PATENT DOCUMENTS

| | | |
|---|---|---|
| CN | 104732986 A | 6/2015 |
| JP | 2007-234826 A | 9/2007 |
| JP | 2007-293998 A | 11/2007 |
| JP | 2007-317873 A | 12/2007 |
| JP | 2012-18984 A | 1/2012 |
| JP | 2015-518229 A | 6/2015 |

OTHER PUBLICATIONS

Office Action in Chinese Patent Application No. 202110068494.7, dated Dec. 30, 2021.
International Search Report and Written Opinion in International Application No. PCT/US2017/033410, dated Oct. 30, 2017.
International Preliminary Report on Patentability in International Application No. PCT/US2017/033410, dated Nov. 29, 2018.
Office Action in Chinese Patent Application No. 201780044298.8, dated Apr. 3, 2010.
Office Action in U.S. Appl. No. 15/598,909, dated Feb. 27, 2019.
Office Action in U.S. Appl. No. 15/598,909, dated Jul. 11, 2019.
Office Action in U.S. Appl. No. 15/598,909, dated Jan. 10, 2020.
Office Action in U.S. Appl. No. 15/598,909, dated Mar. 23, 2020.
Notice of Allowance in U.S. Appl. No. 15/598,909, dated Sep. 30, 2020.
Notice of Decision to Grant in Japanese Patent Application No. 2018-560567, dated Jun. 21, 2022.

* cited by examiner

PROCESS COUPONS USED IN MANUFACTURING FLEXURES

CROSS-REFERENCE TO RELATED APPLICATIONS

This application is a Divisional of U.S. patent application Ser. No. 15/598,909, filed on May 18, 2017, now U.S. Pat. No. 10,910,003, which claims priority from U.S. Provisional Patent Application No. 62/338,118, filed on May 18, 2016, each of which is hereby incorporated by reference in its entirety.

FIELD

Embodiments of the invention relate generally to manufacturing techniques. More particularly, embodiments of the invention relates to using a coupon in the manufacturing of flexures.

BACKGROUND

Flexures generally consist of a spring metal base layer (e.g., stainless steel ("SST")), a conductive trace layer (e.g., copper (Cu)) on one side of the base layer, which is separated from the base layer by an insulating layer (e.g., a dielectric). An insulating covercoat can be applied over all or portions of the conductive layer. Corrosion resistant metals such as gold (Au) and/or nickel (Ni) can be plated or otherwise applied to portions of the trace layer to provide corrosion resistance. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks) can be used to manufacture the flexures in accordance with embodiments of the disclosure. The term "formed" may be used in this application to describe one or more of these processes. In addition, mechanical methods (e.g., using punches and bends) can also be used to manufacture the flexures in accordance with embodiments of the disclosure.

Additive and subtractive processes of these types are, for example, known and used in connection with the manufacture of disk drive head suspensions, and are disclosed generally in the following U.S. patents, all of which are incorporated herein by reference for all purposes: Bennin et al., U.S. Pat. No. 8,885,299, entitled "Low Resistance Ground Joints for Dual Stage Actuation Disk Drive Suspensions;" Rice et al., U.S. Pat. No. 8,169,746, entitled "Integrated Lead Suspension with Multiple Trace Configurations;" Hentges et al., U.S. Pat. No. 8,144,430, entitled "Multi-Layer Ground Plane Structures for Integrated Lead Suspensions;" Hentges et al., U.S. Pat. No. 7,929,252, entitled "Multi-Layer Ground Plane Structures for Integrated Lead Suspensions;" Swanson et al., U.S. Pat. No. 7,388,733, entitled "Method for Making Noble Metal Conductive Leads for Suspension Assemblies;" Peltoma et al., U.S. Pat. No. 7,384,531, entitled "Plated Ground Features for Integrated Lead Suspensions."

As stated above, a number of manufacturing steps are completed to form the layers of the flexures into components having the dimensional and performance requirements needed. As various manufacturing processing steps are completed to form the layers of the flexures, variations can occur making the flexure unable to perform as required. As such, there remains a continuing need for improved manufacturing processes of flexures.

SUMMARY

A system and methods for manufacturing devices such as flexures using process coupons are described. The method including performing a test on at least one feature of a coupon, the coupon is included on an assembly sheet used in manufacturing flexures. The at least one feature is produced by a manufacturing processing step that is used to produce a portion of a flexure. And, the physical characteristics of the feature include at least one physical characteristic that is different than physical characteristics of the portion. The method also including determining the manufacturing processing step will produce an abnormal portion of a flexure based on the performed test. Further, the method includes adjusting the manufacturing processing step and manufacturing a portion of a flexure using the adjusted manufacturing processing step.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

Although the term "block" may be used herein to connote different elements illustratively employed, the term should not be interpreted as implying any requirement of, or particular order among or between, various steps disclosed herein unless and except when explicitly referring to the order of individual steps. Additionally, a "set" or "group" of items (e.g., inputs, algorithms, data values, etc.) may include one or more items, and, similarly, a subset or subgroup of items may include one or more items.

DETAILED DESCRIPTION

Figure 1:
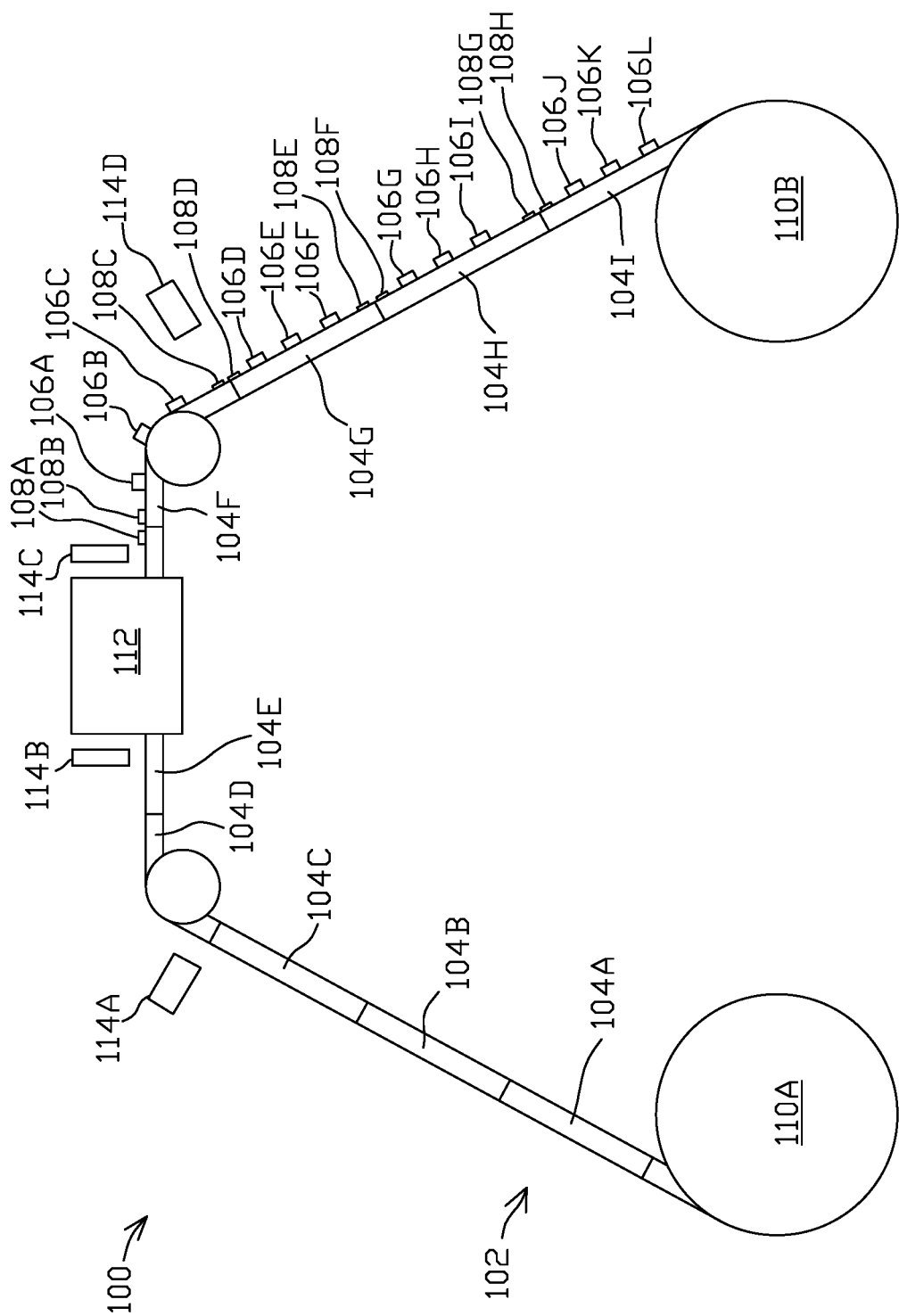
FIG. 1 illustrates a block diagram of a system for using a process coupon to manufacture flexures according to an embodiment.

FIG. 1 is a block diagram of an illustrative system 100 for using process coupons to manufacture devices including, but limited to, flexures according to various embodiments. The system 100 depicts a simplified illustration of a roll-to-roll manufacturing system 100 used to produce a plurality of flexures. As described above, flexures may be used in disk drive head suspensions. In addition, the techniques and methods describe herein can be used to manufacture devices, such as flexures of actuator assemblies, such as shape memory allow actuators used in autofocus and optical image stabilization assemblies.

The system 100 includes a substrate 102. In embodiments, the substrate 102 is a base layer (e.g., SST) that may be partitioned into a plurality of assembly sheets 104A-104I. On each assembly sheet 104A-104I, one or more flexures 106A-106L and coupons 108A-108H may be formed. The flexures 106A-106L and coupons 108A-108H depicted are for illustrative purposes and are not drawn to scale. Each coupon of the coupons 108A-108H may include a plurality of different coupons having different features. For example, each coupon of the coupons 108A-108H may include one or more of the coupons 302A-302E depicted in FIG. 3 and/or include one or more of the coupons described in FIGS. 4-8 below. To form the flexures 106A-106L, the substrate 102 may pass from a first roll 110A to a second roll 110B and vice-versa. When passing between the first roll 110A and the second roll 110B, the substrate 102 transitions through a manufacturing machine 112.

The manufacturing machine 112 may form the flexures 106A-106L using, for example, additive deposition and/or subtractive processes such as wet (e.g., chemical) and dry (e.g., plasma) etching, electro plating and electroless plating and sputtering processes in connection with photolithography. The processes used to form the flexures 106A-106L may also form one or more features included in the coupons 108A-108H. That is, the manufacturing machine 112 may deposit, etch, expose and/or develop one or more layers of material on to the substrate 102 to form the flexures 106A-106L and coupons 108A-108H. For example, the manufacturing machine 112 may deposit one or more dielectric layers (e.g., polyimide) and/or one or more conductive layers (e.g., copper, chrome, nickel, gold and/or the like) on the substrate 102. Each of these layers may be subjected to one or more processes that include, but are not limited to, etching, exposure to a light (e.g., to harden a portion of the material) and/or exposure to one or more chemicals (e.g., to develop the unexposed portions of the material and/or deposit a layer a material on the substrate 102) and other process techniques including those known in the art.

Before and/or after one or more additive deposition and/or subtractive processes (e.g., polyimide developing, resist developing, stainless steel etching, and/or the like), the coupons 108A-108H may be analyzed by one or more sensors 114A-114D. The sensors 114A-114D may be used to determine one or more physical characteristics of the coupons 108A-108H including, but not limited to, size, height, thickness, width, diameter, conductivity, resistance, reflectivity, adhesion, side slope, color and other characteristics that can be used to evaluate a process. Example sensors 114A-114D may include, but are not limited to, cameras to determine sizes of the coupons 108A-108H, electrical probes to measure conductivity/resistance of the coupons 108A-108H, spectrometers to measure the thickness, reflectivity and/or color of the coupons 108A-108H and/or an interferometer (e.g., a white light interferometer, for example a scanning white light interferometer) to measure a surface profile (e.g., thickness and/or width) of the coupons 108A-108H. For example, after a resist layer is developed, the system 100 may pause, a sensor 114A-114D (e.g., a camera) may capture an image of a coupon 108A-108H produced using the process, and it can be determined from the captured image whether the coupon 108A-108H was manufactured correctly. For other embodiments, the system need not be paused for one or more sensors to capture an image of a coupon 108A-108H.

According to some embodiments, testing one or more coupons 108A-108H may require physical contact or even performing destructive testing on the coupons 108A-108H. As such, the testing of the coupons 108A-108H can either reduce or eliminate the likelihood that flexures 106A-106L will be damaged during testing for compliancy of the assembly sheets 104A-104I.

According to various embodiments, the physical characteristics of the coupons 108A-108H are designed to indicate whether a portion of the flexures 106A-106L (e.g., a dielectric layer, conductive layer and/or the like) was manufactured correctly, whether a portion of the flexures 106A-106L includes an abnormality and/or whether parameters, characteristics and/or other aspects of the manufacturing process may need to be altered before abnormal flexures 106A-106L are produced. That is, the manufacturing process may drift during the manufacturing of the flexures 106A-106L due to one or more factors (e.g., chemical control, temperature, process flow rate, expose energies and/or the like). In embodiments, one or more coupons 108A-108H may be used to determine when the manufacturing process begins to drift to either correct the process before faulty or defective flexures 106A-106L, that fail to comply with certain design specifications of the flexures 106A-106L, are produced and/or to determine whether any faulty or defective flexures 106A-106L have been produced.

For example, the coupons 108A-108H may include a plurality of features that are created during the manufacturing process using manufacturing process steps that are used to create the flexures 106A-106L. According to various embodiments, the features included in the one or more coupons 108A-108H are configured to be more sensitive to manufacturing process variations than the one or more devices being manufactured using the one or more processes, such as a flexure 106A-106L. As an example, the features of the coupons 108A-108H may be a plurality of lines that are formed of, for example, polyimide, Cu, Ni, Au and/or the like by the additive and/or subtractive processes used in producing the flexures 106A-106L. The lines may have a range of different widths that vary from approximately 80 microns to 5 microns. Similar, but not identical lines (e.g., 10 micron lines) may be created in the manufacturing of the flexures 106A-106L during the same manufacturing processing step (e.g., formed of the same material as the coupon 108A-108H using the same additive and/or subtractive processes). As such, if a test reveals that one or more of the lines of the coupons 108A-108H include abnormalities, it is likely that the lines of the flexures 106A-106L also include abnormalities or that the process has deviated from its operating tolerances. As such, it will likely be detectable that the manufacturing process is starting to drift from one or more operating tolerances when testing the coupons 108A-108H before the integrity of the flexures 106A-106L is affected. Accordingly, the manufacturing process can be modified when an abnormality of a coupon 108A-108H is detected, so that the flexures 106A-106L do not begin to have unacceptable abnormalities that could affect the performance of the flexures 106A-106L. Examples of modifications that can be made to a manufacturing process include, but are not limited to, the conveyor speed that translates the substrate 102 through the manufacturing machine 112 may be adjusted, the manifold pressure of the manufacturing machine 112 may be adjusted, and other modifications of one or more variables or variations used to modify a process including those known in the art.

Other features of the coupons 108A-108H, according to various embodiments, may be a plurality of holes formed in, for example, polyimide, a photoresist layer, Cu, SST layer, Ni, Au and/or the like by the additive and/or subtractive processes used in producing the flexures 106A-106L. The holes may have a range of different widths varying in diameter, for example from approximately 80 microns to 5 microns. Similar, but not identical holes (e.g., 10 micron holes) may be created in the manufacturing of the flexures 106A-106L during the same manufacturing processing step (e.g., formed in the same material as the coupon 108A-108H using the same additive and/or subtractive processes). If, as determined by a sensor 114A-114D, a 5 micron hole of a coupon 108A-108H is determined to not be completely cleared and/or includes abnormalities, then it may be determined that the one or more portions of the flexures 106A-106L also likely include one or more abnormalities or that the process has drifted beyond one or more operating tolerances. As such, in addition to determining the manufacturing process is beginning to drift before faulty or defective flexures 106A-106L are produced, the system 100 may also be used to determine when faulty or defective flexures 106A-106L are produced. According to various embodiments, after making a determination that the flexures 106A-106L likely include one or more abnormalities, the manufacturing process can be adjusted so that the system 100 will again produce flexures 106A-106L that do not include any abnormalities or so that the one or more manufacturing processes are operating within desired tolerances. For example, one or more of the following used in manufacturing the flexures 106A-106L and coupons 108A-108H may be adjusted: the conveyor speed that translates the substrate 102 through the manufacturing machine 112, the chemistry temperature of the photolithography, the chemical concentrations used in the photolithography, the baking and/or curing temperatures used in the photolithography, and/or the manifold pressure of the manufacturing machine 112 or other processes including those known in the art. Furthermore, any faulty or defective flexures 106A-106L can be removed from the process and either corrected or discarded, so faulty or defective flexures 106A-106L are not sent to a user of the flexures 106A-106L.

In embodiments, thresholds may be used to determine whether faulty or defective flexures 106A-106L have been formed and/or whether to adjust the process for manufacturing the flexures 106A-106L. For example, assume a feature of a coupon 108A-108H includes an aberration from the intended design of the feature. Further assume the aberration of the feature only varies from the intended design by +/−5%. With an aberration of this magnitude (i.e., +/−5%), it may be determined that no faulty or defective flexures 106A-106L have been produced. Furthermore, in embodiments, an aberration of this magnitude may indicate that while aberrations do exist in the features of the coupons 108A-108H, the process for manufacturing the flexures 106A-106L may not need to be adjusted yet. If, however, the magnitude of the aberration is +/−10%, then it may be determined that no faulty or defective flexures 106A-106L have been produced, but the process to manufacture the flexures 106A-106L may need to be adjusted. Alternatively, if the magnitude of the aberration is +/−15%, then it may be determined that faulty or defective flexures 106A-106L have been produced and that the process to manufacture the flexures 106A-106L may need to be adjusted. The thresholds for making each of these determination may be configurable based on the process step and/or the type of feature of the coupon 108A-108H being tested. However, these are only examples and not meant to be limiting.

Figure 2:
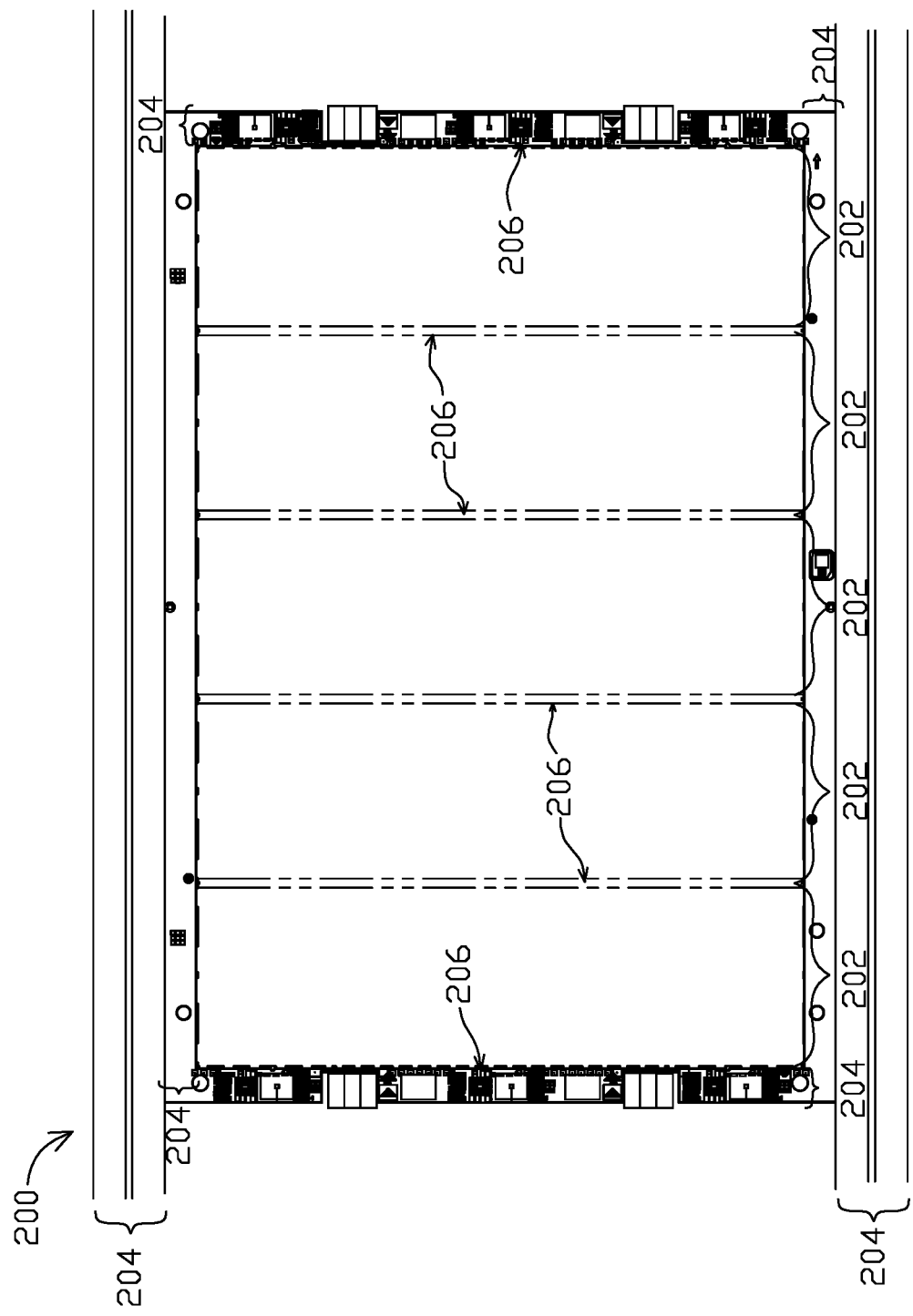
FIG. 2 illustrates an example assembly sheet according to an embodiment.

FIG. 2 is an illustration of a top-down view of an example assembly sheet 200 according to an embodiment. According to some embodiments, the assembly sheet 200 may be approximately 250×300 mm. However, this is only an example and not meant to be limiting. The plurality of flexures, such as the flexures 106A-106L illustrated in FIG. 1, are formed in columns 202 of the assembly sheet 200. Each assembly sheet 200 includes one or more borders 204. The borders 204 are used in the manufacturing process to aid in moving the assembly sheet 200 through the process and to protect flexures, such as the flexures 106A-106L, by adding a stiffening structure around the plurality of flexures 106A-106L to limit excessive bending or movement of the flexures 106A-106L and therefore minimizing damage to the flexures 106A-106L. Proximate to the one or more borders 204 and/or included within the one or more borders 204 are sections where coupons, such as coupons 108A-108H as illustrated in FIG. 1, can be formed. As stated above, the coupons 108A-108H can be tested by sensors (e.g., the sensors 114A-114D depicted in FIG. 1) to determine whether the flexures 106A-106L include abnormalities.

Additionally or alternatively, the coupons 108A-108H can also be formed at other locations of the assembly sheet 200 than the borders 204. For example, the coupons 108A-108H may be formed between the one or more columns 202 of the flexures 106A-106L. As another example, the coupons 108A-108H may be formed between rows of the flexures 106A-106L, including but not limited, formed on the carrier strips 206 to which the flexures 106A-106L are connected.

Figure 3:
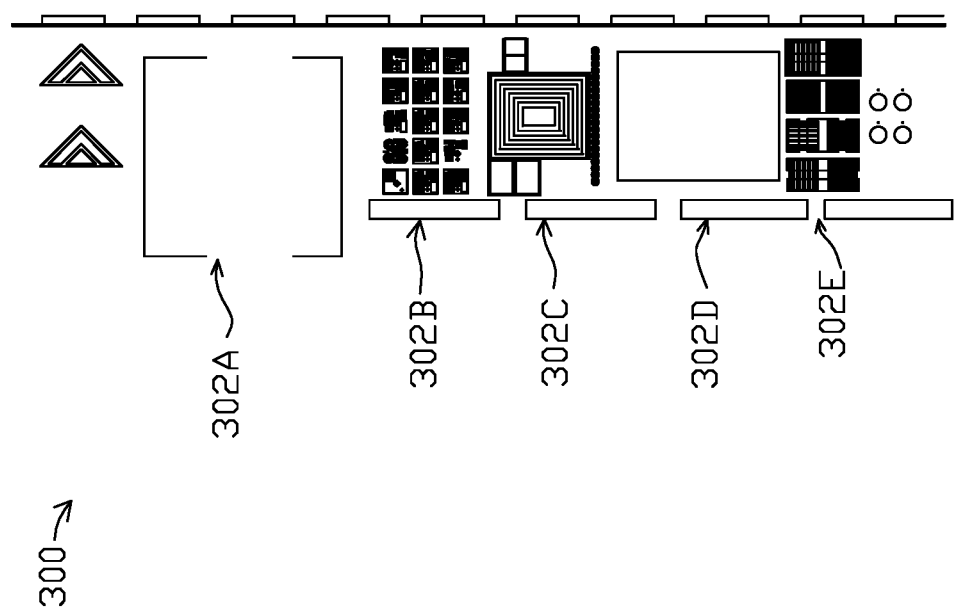
FIG. 3 illustrates a top-down view of a portion of the assembly sheet including a coupon according to an embodiment.

FIG. 3 is an illustration of a top-down view of a portion 300 of a border, such as a border 204 illustrated in FIG. 2. The portion 300 includes a plurality of different types of coupons 302A-302E. Each different type of coupon 302A-302E includes one or more distinct features that are tested by the sensors, such as sensors 114A-114D illustrated in FIG. 1. Various embodiments of coupons 302A-302E are described in more detail in relation to FIGS. 4-8 below. The collection of different types of coupons 302A-302E depicted in FIG. 3 may be a single coupon, such as a one of the coupons 108A-108H illustrated in FIG. 1, that are formed near a border of an assembly sheet, such as an assembly sheet 104A-104I illustrated in FIG. 1.

Figure 4:
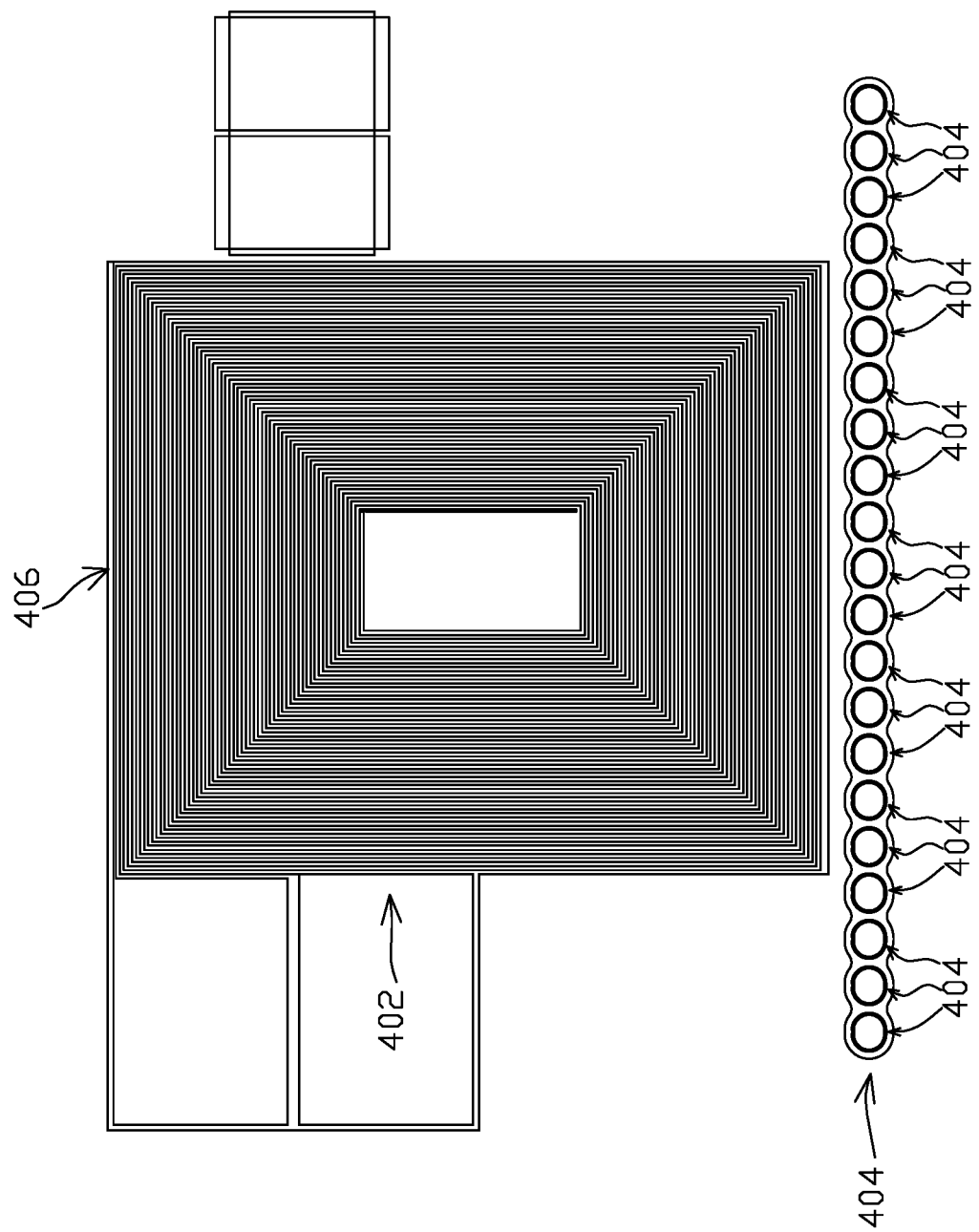
FIG. 4 illustrates coupons according to embodiments.

FIG. 4 is an illustration of exemplary coupons 402, 404 according to some embodiments. Each of the coupons 402, 404 may be incorporated a single coupon of the coupons, such as coupons 108A-108H illustrated in FIG. 1. The coupon 402 includes one or more long conductors 406. To test the coupon 402, electrical probes can probe each end of the one or more long conductors 406 to measure resistance of the coupon 402. Changes in the width of the conductor may create large changes in resistance of the coupon 402. That is, the measured resistance can be used to determine uniformity of the height and the width of the one or more long conductors 406. According to various embodiments, the height and the width of the conductors can also be determined using a vision test (e.g., using a sensor that is a camera). The results of these tests can determine how well the conductive portions of the flexures 106A-106L (of FIG. 1) are being formed. If an aberration of the coupon 402 is determined, the process for manufacturing the flexures, such as flexures 106A-106L illustrated in FIG. 1, may be adjusted to prevent faulty or defective flexures 106A-106L from forming and/or to determine whether faulty or defective flexures 106A-106L have been manufactured.

The coupon 404 includes a plurality of ground features coupled together. When manufacturing flexures, such as flexures 106A-106L illustrated in FIG. 1, each flexure 106A-

106L may have anywhere a number of ground features 408 (e.g., 2-10 ground features). The one or more ground features 408 of the flexures 106A-106L are designed to have a very low resistance. According to various embodiments, the ground features 408 may be plating from a first layer of the flexure (e.g., the trace layer) through a hole in a second layer of the flexure (e.g., the dielectric layer) and into contact with a third layer of the flexure (e.g., the SST layer). Additionally or alternatively, the ground features 408 may also be conductive adhesion holes. Ground features are explained in more detail in U.S. Pat. No. 9,093,117, entitled "Ground Feature for Disk Drive Head Suspension Flexures," the entirety of which is incorporated herein by reference for all purposes.

While the ground features of the flexures are designed to have very low resistance, during the manufacturing of the flexures, such as flexures 106A-106L illustrated in FIG. 1, the resistance of the ground features may gradually increase. By coupling a plurality of ground features (e.g., 10-30 ground features) together in a coupon 404, it can be determined, using a sensor, such as a sensor 114A-114D illustrated in FIG. 1 (e.g., an electrical probe), whether the resistance of the ground features is beginning to increase, has a fault and/or a high resistance due to inadequate plating. If any one of the ground features has a fault, it is likely one or more of the ground features of the flexures 106A-106L also includes a fault.

Figure 5:
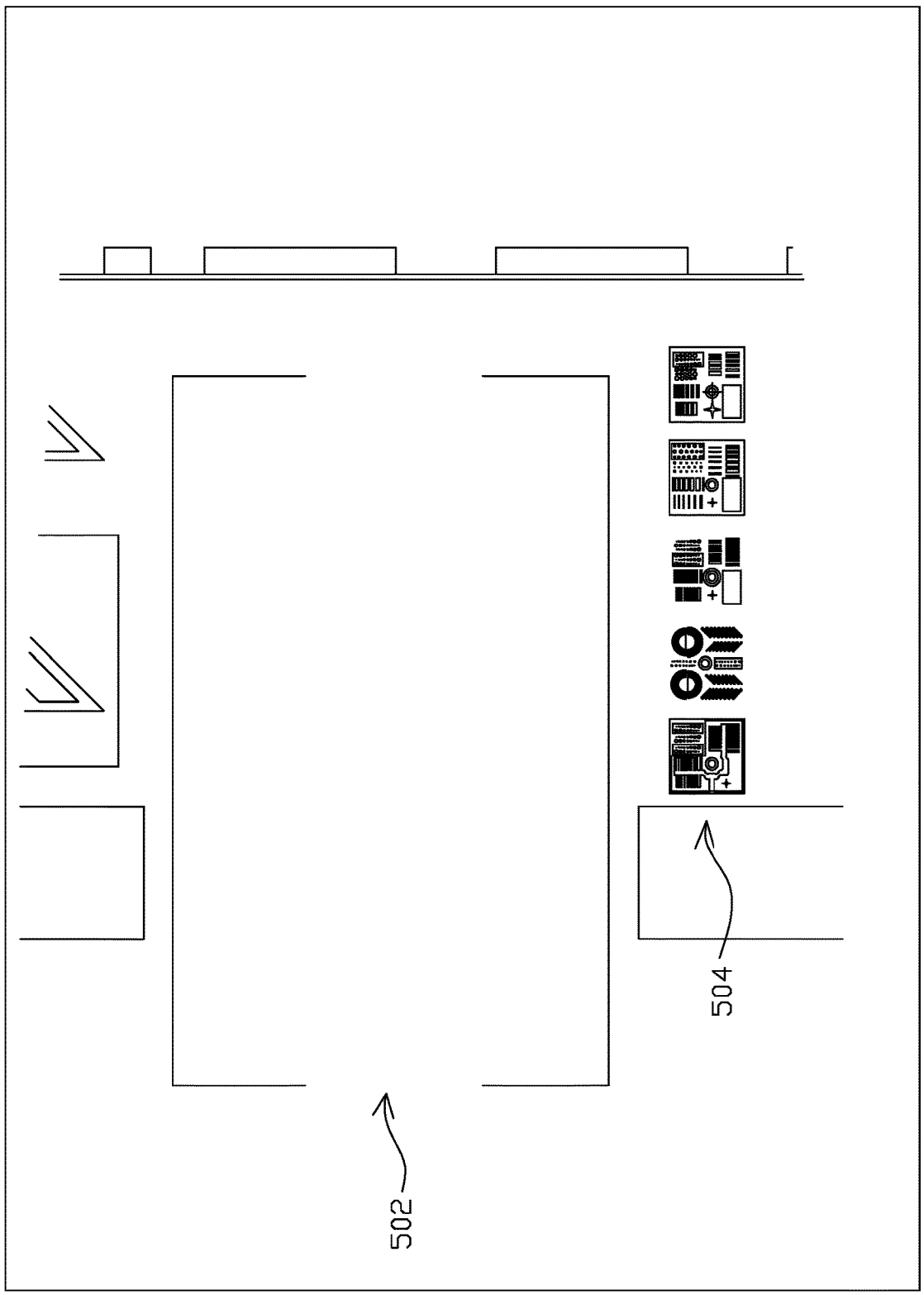
FIG. 5 illustrates coupons according to embodiments.

FIG. 5 illustrates coupons 502, 504 according to various embodiments. Coupon 502 is a spectrometer strip. In embodiments, spectrometer strips may be used to manufacture the flexures, such as flexures 106A-106L as illustrated in FIG. 1, using a wet coating process. During the wet coating process, the substrate, such as the substrate 102 as illustrated in FIG. 1, is being translated through the manufacturing machine, such as the manufacturing machine 112 illustrated in FIG. 1, at a translation speed. Using a spectrometer, the thickness of the coupon 502 and any residues on the coupon 502 may be determined. By determining the thickness of the coupon 502, it can be determined whether one or more layers (e.g., spectrometer strips and/or a dielectric layer) are applied to the appropriate thickness by the manufacturing machine 112 at the translation speed of the substrate 102. If the coupon 502 does not have an appropriate thickness, the translation speed of the substrate 102 may be decreased. Moreover, the manufacturing process steps may include cleaning one or more surfaces of the flexure. As such, by determining whether any residues are on the coupon 502 can determine whether the one or more surfaces of the flexures 106A-106L are being adequately cleaned.

Figure 7:
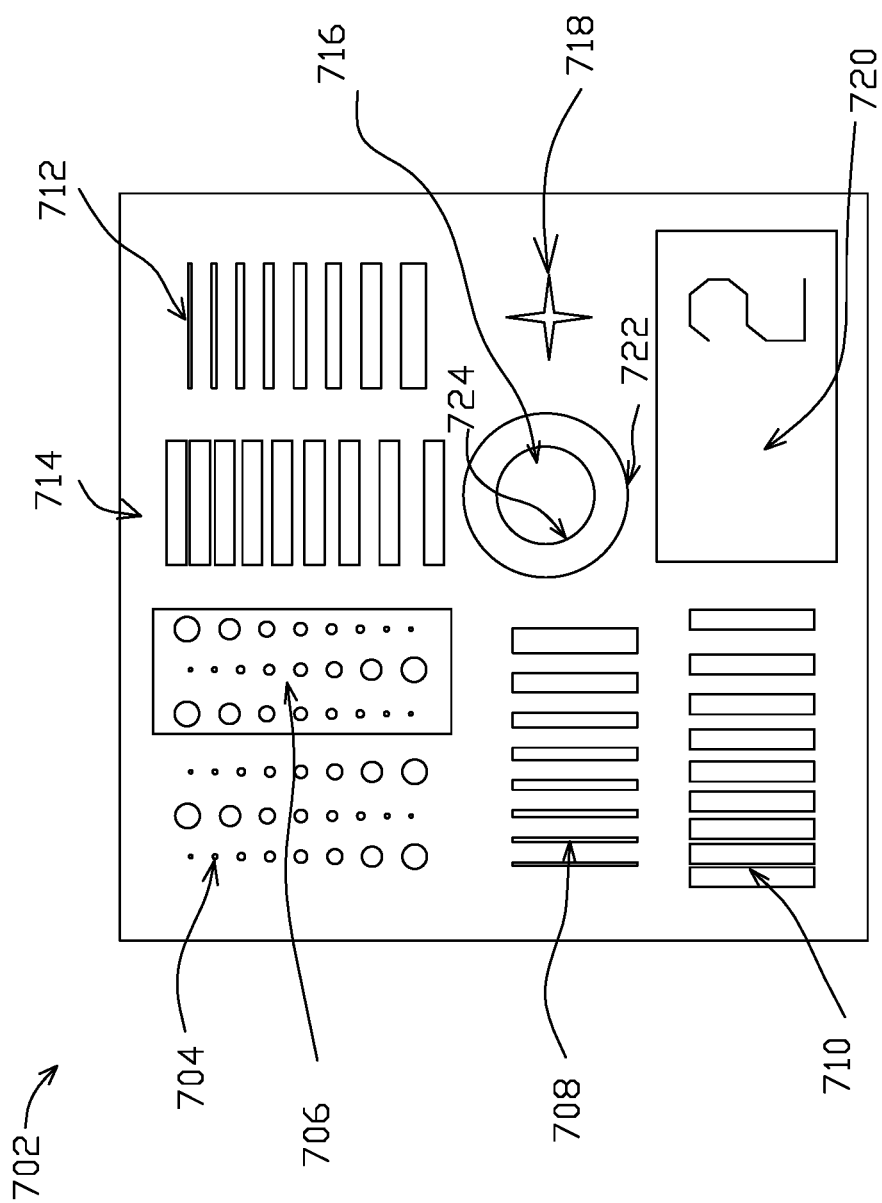
FIG. 7 illustrates coupons according to embodiments.
Figure 8:
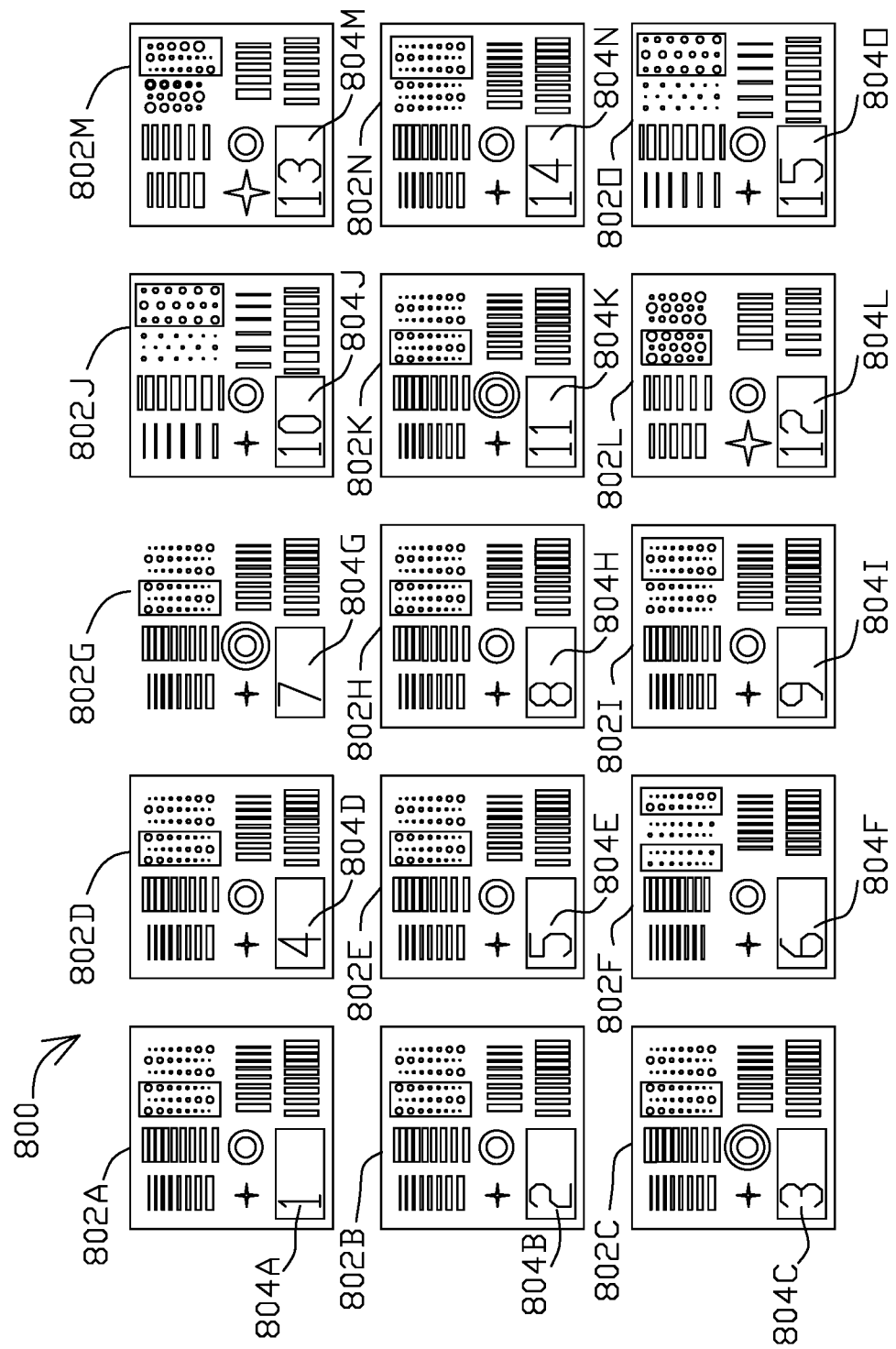
FIG. 8 illustrates a plurality of the coupons according to embodiments.

FIG. 5 also includes a plurality of coupons 504, which are shown to indicate that different coupons may have a different scale with respect to other coupons, such as various embodiments described in more detail with respect to FIGS. 7 and 8.

Figure 6:
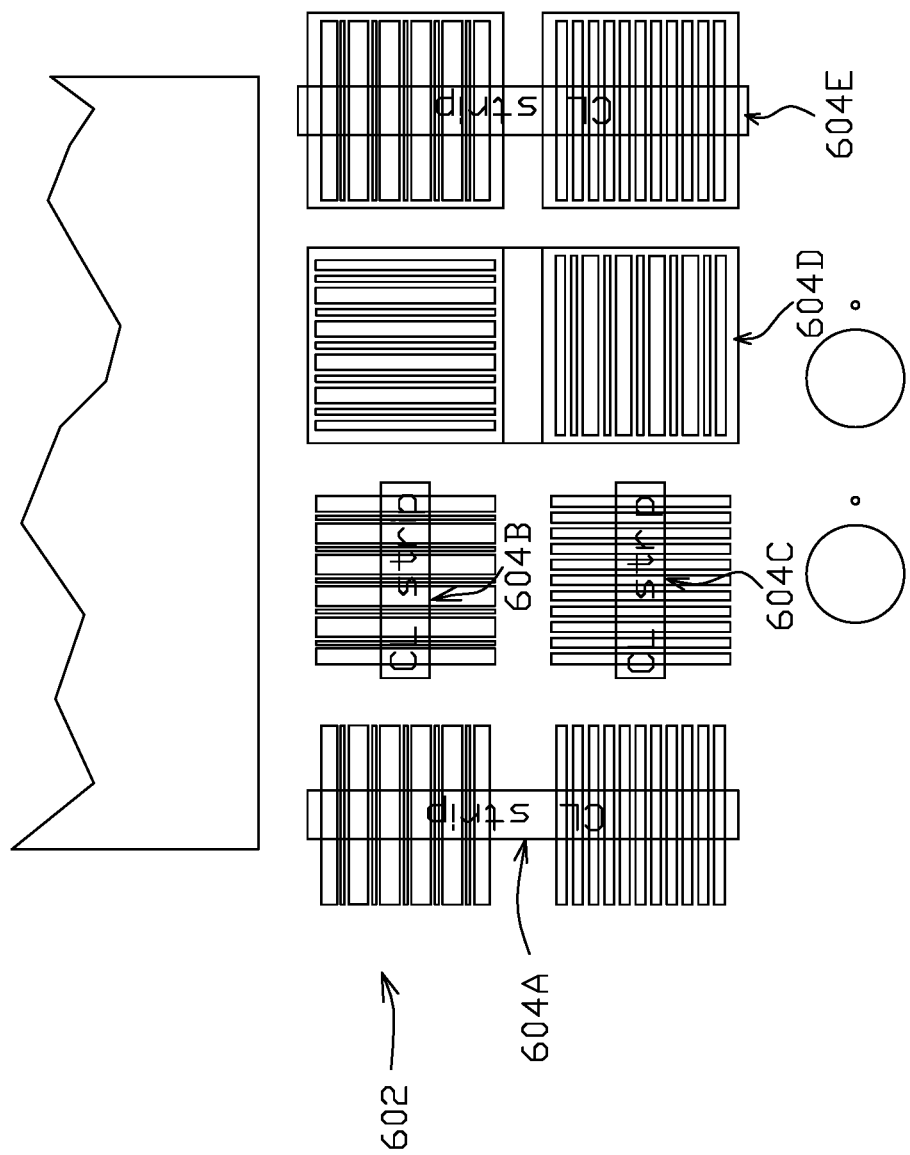
FIG. 6 illustrates coupons according to embodiments.

FIG. 6 illustrates a coupon 602 according to an embodiment. The coupon 602 may include a plurality of features 604A-604E wherein the surface profile (e.g., the thickness and/or width) of the plurality of features 604A-604E are determined using interferometry (e.g., white light interferometry). The coupon 602 may include a plurality of coating liquids formed on layers that are used to produce the flexures 106A-106L. For example, a coating liquid ("CL") may be applied to a conductive layer and/or a dielectric layer of the flexures, such as flexures 106A-106L illustrated in FIG. 1. According to various embodiments, the CL may flow off the layer of the flexures 106A-106L that the CL is intended to coat. The amount of CL that flows off may depend on one or more of, for example, the size of the layer that is being coated, the type of layer that is being coated, the liquid that is being used as the CL, temperature of the CL, ambient temperature of the layer and CL and/or the like. By applying a CL to various widths of features 604A-604E that, according to some embodiments, are made of different types of materials and determining the surface profile of the CL (i.e., the features 604A-604E), it can be determined whether the one or more CL layers of the flexures 106A-106L are being applied or removed to result in features having the appropriate widths, heights or depths.

FIG. 7 illustrates a coupon 702 according to various embodiments. The coupon 702 includes a plurality of features 704-718. If one or more of the features 704-718 includes an aberration, as sensed by the sensors, such as sensors 114A-114D illustrated in FIG. 1, then the manufacturing process may be adjusted and/or it may be determined that one or more of the flexures, such as flexures 106A-106L illustrated in FIG. 1, are faulty or defective.

Feature 704 includes a series of holes with a range of different diameters that may be formed in, for example, polyimide, a photoresist layer, Cu, SST layer, Ni, Au and/or the like by the additive and/or subtractive processes used in producing the flexures 106A-106L. According to various embodiments, feature 704 is configured to indicate a minimum adhesion resist or minimum cleared plating for a process. The sensors 114A-114D, according to various embodiments, may sense the smallest hole that is being cleared out consistently, which provides an indication at how well the manufacturing process used to produce the flexures 106A-106L is working. As stated above, if the flexures 106A-106L include holes that are 10 microns, the holes of the features 704 may be smaller than 10 microns to determine whether the manufacturing process is drifting before faulty or defective flexures 106A-106L are produced.

Feature 706 includes a series of dots that are formed of, for example, polyimide, Cu, Ni, Au and/or the like by the additive and/or subtractive processes used in producing the flexures 106A-106L on the coupon 702. According to various embodiments, feature 706 is configured to indicate a minimum resist cleared or minimum adhesion plating for a process. The sensors 114A-114D may sense what the smallest dots that are being adhered to the surface of the coupon 702 using techniques including those described herein, as determined by the presence of the smallest dot on the surface of the coupon 702.

Features 708, 712 include vertical and horizontal troughs, respectively, having a range of different widths and spacing's that are formed in, for example, polyimide, a photoresist layer, Cu, SST layer, Ni, Au and/or the like by the additive and/or subtractive processes used in producing the flexures 106A-106L. According to various embodiments, features 708, 712 are configured to indicate a minimum resist cleared or a minimum adhesion plating vertical and horizontal, respectively, for a process. The sensors 114A-114D may sense the smallest trough 708, 712 that is being cleared out consistently using techniques including those described herein, which provides an indication at how well the manufacturing process used to produce the flexures 106A-106L is working.

Features 710, 714 include vertical and horizontal lines, respectively, having a range of different widths and spacings that are formed of, for example, polyimide, Cu, Ni, Au and/or the like by the additive and/or subtractive processes used in producing the flexures 106A-106L on the coupon 702. According to various embodiments, features 710, 714 are configured to indicate a minimum resist line or a minimum plating cleared, respectively, for a process. The sensors 114A-114D may sense the smallest line that is being applied consistently to the coupon 702 using techniques including those described herein, which provides an indication at how well the manufacturing process used to produce the flexures 106A-106L is working. 708, 712. According to various embodiments, for example, the range of widths of the features 704-718 may be from 5 microns to 80 microns.

Since the substrate, such as a substrate 102 illustrated in FIG. 1, is being translated through the manufacturing machine, such as a manufacturing machine 112 illustrated in FIG. 1, in one direction, chemicals may be applied to the substrate 102 either in the same direction or perpendicular to the direction that the substrate 102 is being translated. As such, variances between the vertical 708, 710 and horizontal features 712, 714 that are being cleared and/or applied may be different, which is why both vertical 708, 710 and horizontal 712, 714 troughs and lines are tested, according to some embodiments. Similar to the features 704, if the flexures 106A-106L include troughs or holes that are 10 microns wide, the troughs or holes of the features 708-714 may be smaller than 10 microns to determine whether the manufacturing process is drifting before faulty or defective flexures 106A-106L are produced.

Feature 716 is a registration feature to a previous layer. The feature 716 includes an outside rim 722, which is from one layer, and an inner circle 724, which is from a different layer. The feature 716 will be measured using a sensor 114A-114D to determine how well the two layers are registered to each other. How well one layer is registered to another layer is the degree to which the inner circle 724 of the feature 716 is offset from a desired central location in the outside rim 722 of the registration feature.

Feature 718 is a star shaped pattern which exaggerates the side slope of features of the flexures 106A-106L. The side slope of a feature is the angle of a side of the feature. That is, a feature (e.g., a polyimide layer) of the flexures 106A-106L that is etched by the additive and/or subtractive processes used to produce the flexures 106A-106L may not have a side that is perpendicular to a surface of the substrate. The angle relative to a perpendicular of a feature is referred to as the side slope. As such, by testing the side slope of a feature 718 that exaggerates the side slope of the flexures 106A-106L, it can be determined that the side slope of the features of the flexures 106A-106L are consistent. To sense the side slop, a vision system may be used, which is a type of sensor, such as sensors 114A-114D illustrated in FIG. 1.

Feature 720 is a calibration pad which can be used to calibrate a vision system that is a type of sensor, such as those included in the sensors 114A-114D. The feature 720 (i.e., the calibration pad) can be used to determine the focal height and light intensity of the vision system based on the reflectivity of the calibration pad. The feature 720 can be made of the same material as the layer that is being formed on the substrate, such as a substrate 102 illustrated in FIG. 1. For example, the feature 720 may be made of a dielectric, conductive layer, or other material known in the art including those described herein. This will increase the likelihood that the feature 720 has the same reflectivity calibration (which may change due to topographic changes, surface oxide conditions, etc.) as the layer that is being formed on the substrate 102. In embodiments, the vision system may be a greyscale vision system.

FIG. 8 illustrates a plurality of the coupons 800 according to various embodiments. For some embodiments, the plurality of coupons 800 include features similar to those described in reference to those illustrated in FIG. 7. As stated above, multiple layers may be applied to the substrate, such as substrate 102 illustrated in FIG. 1, when manufacturing the flexures, such as flexures 106A-106L illustrated in FIG. 1. After each layer of the flexures 106A-106L, a coupon 802A-802O of the plurality of coupons 800 may be added to the layer. Each coupon 802A-802O that is formed may correspond to the specific manufacturing process for that layer of the flexures 106A-106L. For example, if a first layer of the flexures 106A-106L is a polyimide layer, a first coupon (e.g., coupon 802A) may be formed, on the border 204 (of FIG. 2) of the assembly sheet 200 (of FIG. 2), using the same manufacturing process step to produce the polyimide layer of the flexures 106A-106L. That is, the coupon 802A may include polyimide features (e.g., a range of holes with different diameters, a range of dots with different diameters, a range of troughs with different widths, a range of lines with different widths and/or the like) that are similar to but of different dimensions than the polyimide layer of the flexures 106A-106L. As such, the resolution/adhesion of each layer may be determined using the respective coupons 802A-802O for each layer. The numbers 804A-O for each respective coupon 802A-802O may indicate the layer to which the coupon 802A-802O pertains. For example, coupon 802A may be the coupon included on the first layer, coupon 802B may be the coupon included on the second layer, etc.

Furthermore, including a respective coupon 802A-802O for each layer that is produced during the manufacturing of the flexures, such as flexures 106A-106L illustrated in FIG. 1, may also determine whether the resolution/adhesion of the coupon 802A-802O is affected when combined with other layers that are produced during the manufacturing of the flexures 106A-106L. For example, a coupon 802A-802O produced on a conductive layer that is formed on top of a polyimide layer may have defects that are not detected when a coupon is formed on top of a conductive layer that is not formed on top of a polyimide layer. As such, stacking coupons 802A-802O on multiple layers may provide a better indication of the quality of flexures 106A-106L produced during the manufacturing of the flexures 106A-106L since the flexures 106A-106L include multiple layers stacked on one another.

Additionally or alternatively, after each layer, all the manufacturing process steps that are used to produce the flexures 106A-106L may be used to form coupons 802A-802O. For example, even though a polyimide layer may be formed during a layer, the coupons 802A-802O may also include features corresponding to a conductive trace layer.

Figure 9:
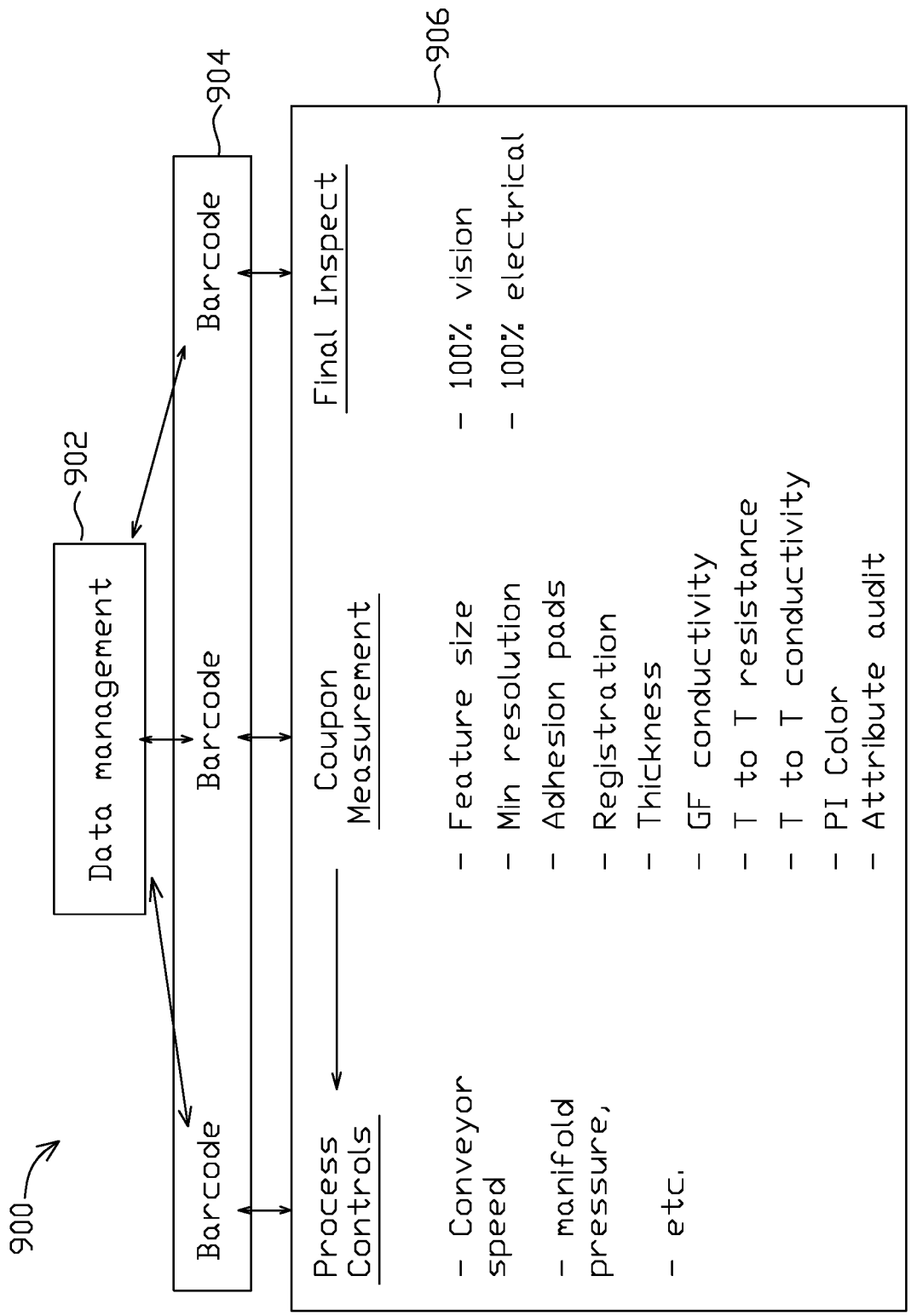
FIG. 9 illustrates a diagram of a data management process flow according to an embodiment.

FIG. 9 is a diagram of a data management process flow 900 according to an embodiment. According to various embodiments, the process flow 900 may include receiving a signal identifying an assembly sheet including a formed coupon (902). Each assembly sheet may have its own barcode, which is scanned using sensors including those described herein. After each manufacturing process step, the barcode for each assembly sheet may be read by a barcode scanner (904). According to various embodiments, one or more of the sensors 114A-114D may be barcode scanners.

Each time a barcode for an assembly sheet is scanned, the results of any scans/tests performed by the sensors on the coupons may also be received (906). From each of the tests, it can be determined whether the received result indicates whether one or more coupons include aberrations and, therefore, the flexures possibly include faulty or defective flexures, as well. All this information may be tracked during the course of producing the flexures. If it is determined that an assembly sheet may include faulty or defective flexures, additional inspection of the assembly sheet may be performed and/or the assembly sheet may be rejected. As such, each assembly sheet may be tracked through the entire process.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the embodiments is intended to embrace all such alternatives, modifications, and variations as fall within the scope of the claims, together with all equivalents thereof. While the disclosed subject matter is amenable to various modifications and alternative forms, specific embodiments have been shown by way of example in the drawings and are described herein. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

What is claimed is:

1. An assembly sheet configured to manufacture flexures comprising:
   at least one first section including a flexure;
   at least one second section including at least one coupon, the at least one coupon including:
      at least one first feature formed on the at least one second section of the assembly sheet, the at least one first feature includes a shared physical characteristic as a formed portion of the flexure,
      the at least one first feature is configured to be tested to indicate whether the formed portion of the flexure is abnormal; and
      at least one second feature formed on the assembly sheet that includes a physical characteristic that is different than physical characteristics of the formed portion of the flexure.

2. The assembly sheet of claim 1, wherein the shared physical characteristic includes at least one of: size, height, thickness, width, diameter, conductivity, resistance, reflectivity, adhesion, side slope, and color.

3. The assembly sheet of claim 1, wherein the physical characteristic that is different than physical characteristics of the formed portion of the flexure includes at least one of: size, height, thickness, width, diameter, conductivity, resistance, reflectivity, adhesion, side slope, and color of the at least one first feature.

4. The assembly sheet of claim 1, wherein the shared physical characteristic is configured to be tested using at least one of: a vision test, an electrical test, a spectroscopy test and a white light interferometer test.

5. The assembly sheet of claim 1, wherein the at least one second feature includes varying sizes of at least one of: a plurality of circular dots, a plurality of circular holes, a plurality of horizontal rectangles, a plurality of horizontal rectangular troughs, a plurality of vertical rectangles, a plurality of vertical rectangular troughs, registration layers, a star pattern, a plurality of ground features, and a spiraled conductor.

6. The assembly sheet of claim 1, wherein the at least one second feature includes a similar set of features, each of the similar set of features having a range of different dimensions.

7. The assembly sheet of claim 6, wherein the similar set of features is at least one of: a set of holes, a set of dots having a range of different diameters, a set of horizontal rectangles having a range of different widths, a set of horizontal rectangular troughs having a range of different widths, a set of vertical rectangles having a range of different widths and a set of vertical rectangular troughs having a range of different widths.

8. The assembly sheet of claim 1, wherein the at least one first feature formed on the assembly sheet using at least one of: applying a dielectric layer, applying a conductive layer, applying a backing layer, etching a base layer, etching a dielectric layer, etching a conductive layer and etching a backing layer.

9. The assembly sheet of claim 1, wherein the at least one second section, the at least one coupon is located proximate to at least one of: a border of the assembly sheet, between a row of flexures, between a column of flexures and on a carrier strip of the assembly sheet.

10. An assembly sheet comprising:
    at least one section including at least one coupon, the at least one coupon including:
       at least one first feature formed on the at least one section of the assembly sheet, the at least one first feature includes a shared physical characteristic as a formed portion of a device on the assembly sheet,
       the at least one first feature is configured to be tested to indicate whether the formed portion of a flexure is abnormal; and
       at least one second feature formed on the assembly sheet that includes a physical characteristic that is different than physical characteristics of the portion of the device.

11. The assembly sheet of claim 10, wherein the shared physical characteristic includes at least one of: size, height, thickness, width, diameter, conductivity, resistance, reflectivity, adhesion, side slope, and color.

12. The assembly sheet of claim 10, wherein the physical characteristic that is different than the physical characteristics of the formed portion of the flexure includes at least one of: size, height, thickness, width, diameter, conductivity, resistance, reflectivity, adhesion, side slope, and color of the at least one first feature.

13. The assembly sheet of claim 10, wherein the shared physical characteristic is configured to be tested using at least one of: a vision test, an electrical test, a spectroscopy test and a white light interferometer test.

14. The assembly sheet of claim 10, wherein the at least one second feature includes varying sizes of at least one of: a plurality of circular dots, a plurality of circular holes, a plurality of horizontal rectangles, a plurality of horizontal rectangular troughs, a plurality of vertical rectangles, a plurality of vertical rectangular troughs, registration layers, a star pattern, a plurality of ground features, and a spiraled conductor.

15. The assembly sheet of claim 10, wherein the at least one second feature includes a similar set of features, each of the similar set of features having a range of different dimensions.

16. The assembly sheet of claim 15, wherein the similar set of features is at least one of: a set of holes, a set of dots having a range of different diameters, a set of horizontal rectangles having a range of different widths, a set of horizontal rectangular troughs having a range of different widths, a set of vertical rectangles having a range of different widths and a set of vertical rectangular troughs having a range of different widths.

17. The assembly sheet of claim 10, wherein the at least one first feature formed on the assembly sheet using at least one of: applying a dielectric layer, applying a conductive layer, applying a backing layer, etching a base layer, etching a dielectric layer, etching a conductive layer and etching a backing layer.

18. The assembly sheet of claim 10, wherein the at least one second feature, the at least one coupon is located proximate to at least one of: a border of the assembly sheet, between a row of flexures, between a column of flexures and on a carrier strip of the assembly sheet.

\* \* \* \* \*